Jan. 26, 1954

T. K. YOUNG ET AL
METHOD OF PRODUCING TRANSPARENT
ELECTRICALLY CONDUCTING FILMS
Filed July 6, 1949

2,667,428

INVENTORS
Thomas K. Young and
BY James W. McCuley

Nobbe & Swope
ATTORNEYS

Patented Jan. 26, 1954

2,667,428

UNITED STATES PATENT OFFICE 2,667,428

METHOD OF PRODUCING TRANSPARENT ELECTRICALLY CONDUCTING FILMS

Thomas K. Young, Toledo, and James W. McAuley, Perrysburg, Ohio, assignors to Libbey-Owens-Ford Glass Company, Toledo, Ohio, a corporation of Ohio Application July 6, 1949, Serial No. 103,192

2 Claims. (Cl. 117—54)

The present invention relates broadly to transparent electrically conducting films or coatings on glass or other vitreous materials, and more particularly to a method and apparatus for producing clear, fog-free and unclouded films of this general character.

Transparent, substantially colorless, electrically conducting films of tin oxide have already been produced commercially by the reaction of tin halides in fluid form on glass heated to substantially its point of softening; but the problem of producing such films that are also free of fog has been a very serious one. The fog formed in these films varies in occurrence from isolated patches to general over-all cloudiness, and is extremely objectionable both from the standpoint of appearance and of good visibility, especially when the film is to be used in a location where these factors are of prime importance, such as in windshields or windows of automobiles or airplanes, in optical instruments, etc.

Tin oxide films that are transparent and electrically conducting have been applied to hot glass in a number of different ways, including spraying, dipping and fuming, with tin halide vapors or solutions. However, in producing films of the low resistivities now commonly specified, especially for aircraft glazings, spray gun filming has proved to be far superior to vapor and dipping methods; and the company to which this application is assigned now uses the spray method exclusively in all of its commercial production of these films.

Nevertheless, even with the greatly improved techniques that have recently become available, when the heated glass was sprayed with a solution of tin halide, foggy areas invariably occurred in the film on the end of the glass opposite where the spray guns were actuated, being most intense on the edge and decreasing in intensity toward the center.

Now, it is the primary aim of the present invention to produce transparent electrically conducting films that are fog-free and unclouded.

Another object is to prevent the formation of fog in transparent electrically conducting films that are produced by conventional methods and apparatus.

The invention is based on the discovery that the fog in these films is caused by hydrochloric acid vapor, which is present during spraying as a hydrolysis product of the tin halide; and broadly stated, the invention consists in preventing this HCl vapor from reacting with the hot glass surface to cause clouding of the film.

Specifically, this can be done in three different ways: (1) by mechanically removing the HCl vapors from the scene before they can react on the hot glass; (2) by blanketing the surface to be filmed with spray; and (3) by retarding the reaction of the spray solution until it reaches the glass.

Other objects and advantages of the invention will become more apparent during the course of the following description, when taken in connection with the accompanying drawings.

In the drawings, wherein like numerals are employed to designate like parts throughout the same:

Figure 1:
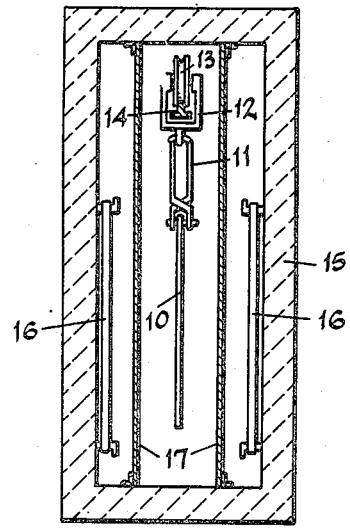
Fig. 1 is a transverse section through a furnace within which a glass sheet is heated prior to filming.
Figure 2:
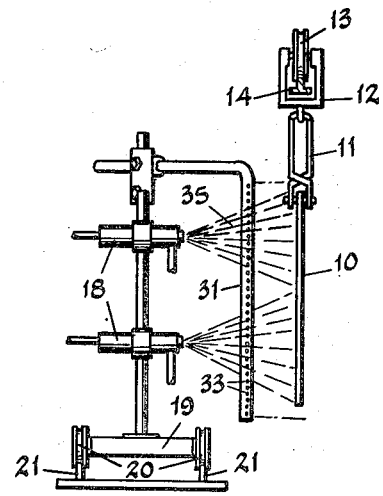
Fig. 2 is an end view of the filming apparatus, showing a glass sheet in position to be filmed.

Referring now more particularly to the drawings, there is illustrated in Figs. 1 and 2 a conventional form of apparatus for use in producing transparent electrically conducting films on glass plates or sheets, together with additional apparatus which is designed to prevent the formation of fog in such films in accordance with a preferred form of the present invention.

As indicated above, transparent electrically conducting films are usually produced by the reaction of a tin halide on the surface of a vitreous body which has been heated to substantially its point of softening, and the halide may be applied to the hot surface by any of the known spraying, dipping or fuming methods.

However, the spray method is generally preferred, and the present invention will be described in connection with it.

Thus, as illustrated in the drawings, in one conventional procedure, a properly cleaned glass sheet 10 is suspended from tongs 11, hung from a carriage 12 which is movably supported from wheels 13 running on a monorail 14. The carriage 12 is then moved along the rail 14, to carry it first into a furnace 15, within which it is heated to substantially the softening point of the glass.

The furnace 10 may be heated in any suitable manner, such as by means of the electrical resistance heaters 16 which are located behind the baffle plates 17 to provide a more uniform temperature throughout the heating area.

When treating 1/8" thick automotive plate glass such as is illustrated in the drawings, it is customary to heat it for two minutes at 1200 degrees Fahrenheit, and, immediately after it is withdrawn from the furnace, to position it before the spray guns 18 (Figs. 2 and 3) where it is sprayed with a solution of a tin halide to form the electrically conducting film.

Any of the tin halides, dissolved in a suitable solvent, can be used for the filming treatment. Generally, we prefer to use stannic tetrachloride in an organic solvent and the present standard spray solution of the assignee company is 10% solution of $SnCl_4$ in isopropyl alcohol by volume.

In order to obtain a uniform coating of the spray solution over the surface of the sheet 10, it is desirable to reciprocate the spray back and forth over the sheet. For this purpose, the spray guns 18 are mounted on a carriage 19, provided with wheels 20 which run on the tracks 21. The carriage 19 is moved back and forth over the tracks 21 a sufficient number of times to give a film of the desired thickness on the glass surface, and movement of the carriage may be effected in any suitable manner, for example by means of an air or hydraulic cylinder 22 having a reciprocating piston rod 23 which is secured to the end of the carriage 19 as at 24.

After filming, the glass sheet is preferably cooled in the atmosphere, and is then ready for use.

The exact chemical action which takes place at the glass-air interface when the hot glass is sprayed with the solution of stannic tetrachloride is not completely understood, but it is known that stannic tetrachloride hydrolyzes to form stannic hydroxide or othostannic acid, thus:

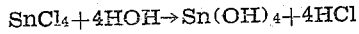
$$SnCl_4 + 4HOH \rightarrow Sn(OH)_4 + 4HCl$$

At the temperature of the reaction the stannic hydroxide would become $SnO_2$ or $H_2SnO_3$, as shown below:

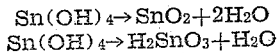
$$Sn(OH)_4 \rightarrow SnO_2 + 2H_2O$$
$$Sn(OH)_4 \rightarrow H_2SnO_3 + H_2O$$

It is improbable that stannous oxide, SnO, is involved because this compound is the reduction product of stannic oxide, and it has been found that when a film, formed with $SnCl_4$ vapors, is heated with a hydrogen flame, which would reduce $SnO_2$ to SnO, the electrical conducting properties are destroyed. Also, it is known that stannous oxide is slowly transformed into stannic oxide upon exposure to air.

In any event, regardless of the exact chemical nature of the film, it is transparent and has an electrical resistivity that is many millions of times less than that of the glass itself.

However, as explained above, this conventional spraying procedure results in fog in the film which is objectionable both from the standpoint of appearance and transparency, especially in the presently most common uses of the filmed glass; i. e., aircraft glazings, radio locator devices, television, photosensitive apparatus, etc.

Now we have discovered that this fog is due to the action of hydrochloric acid gas, which is an hydrolysis product of $SnCl_4$, on the hot glass just prior to filming.

We have also discovered that this fog can be eliminated by preventing the hydrochloric acid, which is formed during the reaction of the spray with the heated glass, from contacting the glass until a layer of the tin oxide film has formed thereon.

According to the preferred method, we do this by removing the HCl gas mechanically before it can contact the uncoated glass surface. As illustrative of this technique, we direct a stream of air across the surface of the glass, while it is being filmed, in a manner to force the spray vapors, which contain the HCl gas, to trail the spray guns.

Figure 3:
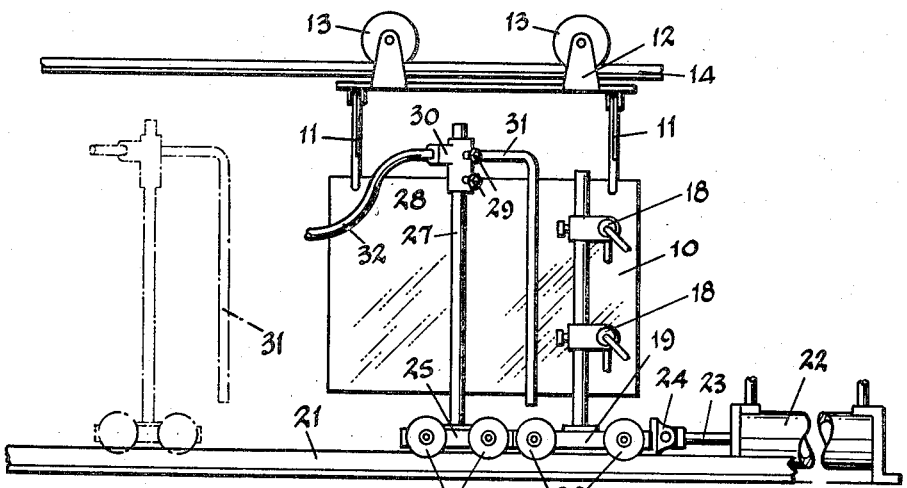
Fig. 3 is a side view of the filming apparatus, showing the special air pipe in operative and inoperative positions.
Figure 4:
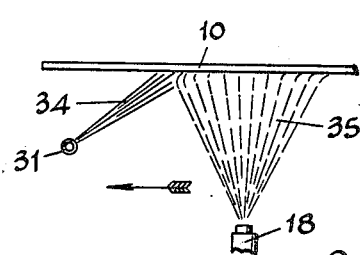
Fig. 4 is a diagrammatic plan view showing a sheet of glass being sprayed, and the action of the blast from the special air pipe on the pattern of the spray.

An apparatus designed to produce this result is shown in Figs. 2, 3 and 4 of the drawings. As there illustrated, the apparatus for blowing air across the sheet comprises a second carriage 25 mounted on wheels 26 which run on the tracks 21 in advance of the first or spraying carriage 19. Mounted centrally of the carriage 25 is a vertical post 27, which carries a slidably and rotatably mounted sleeve type bracket 28 adapted to be held in adjusted position on the post 27 by set screws 29, and which includes a second right angled sleeve portion 30. Slidably mounted in the sleeve portion 30 is the base of an inverted L-shaped air pipe 31, which is connected to a source of compressed air (not shown) by means of a flexible conduit 32.

The leg portion of the pipe 31 is provided with a series of air discharge openings 33, and the bracket 28 and pipe 31 are adjusted on the post 27 in a manner to cause a curtain of air 34 discharged from the openings 33 to impinge from an acute angle onto the glass sheet 10 at the leading edge of the filming sprays 35 from the guns 18, as shown in Fig. 4. In this way the reaction products of the filming spray, including the HCl vapor, are blown from the leading toward the trailing end of the spray and the hydrochloric acid gas is prevented from contacting the glass in advance of the leading end of the spray where it is unprotected by the $SnO_2$ film being formed by the spray reaction.

Once the spray guns have made a complete pass over the glass it is no longer necessary to use the air blast because we have discovered that the HCl vapor has no fogging effect after the surface has been covered by even a very thin film of $SnO_2$.

In operation, the carriage 19 is located in a position where the right hand margin of the sheet 10 will be filmed when the spray is turned on, and the carriage 25 is positioned against the carriage 19 so that it will be pushed along by the latter as the carriage 19 is moved to the left by the piston rod 23.

The air blast or curtain 34 and the sprays 35 are preferably turned on simultaneously, and at the same time the air cylinder 22 is placed in operation to reciprocate the carriage 19 back and forth in front of the sheet 10. The carriage 25 is not connected to the carriage 19 so that upon completion of the first pass of the sprays over the sheet the carriage 19 will be left in the position shown in broken lines in Fig. 3 while the carriage 19 continues to move back and forth until a film of the desired thickness is obtained.

In addition to the method just described, there are a number of other ways in which the HCl vapors, formed during filming, can be prevented from acting on the hot unprotected surface of the glass to cause fogging in the electrically conducting film.

Examples of these are: (1) filming the glass by blanketing the entire sheet with spray; and (2) retarding the reaction of the spray solution until the solution is actually in contact with the heated glass by using a cold spray solution and/or cold atomizing air.

In the first of these additional methods a sufficient number of spray guns are provided to blanket the sheet over its entire area at the same time with filming spray. When this is done the surface is completely coated with SnO₂ immediately, and the heavier stannic oxide formed during the spray reaction constantly displaces and drives off the hydrochloric acid gas which is also being formed so that it has no opportunity of reacting with an unprotected part of the glass.

In connection with the retarding of the reaction of the spray solution, it has been noticed that fogginess in these electrically conducting films is greater in hot weather than in cold weather. This is because the spray solution reacts faster while at an elevated temperature so that hydrochloric acid gas is formed before the spray reaches the glass. This gives the HCl vapor a greater opportunity of reacting with the hot glass on the portions of the sheet around the spray or that are not immediately filmed with SnO₂.

However, we have discovered that we can retard the reaction of the spray solution prior to contact with the heated glass, and in this way greatly reduce if not entirely prevent fogging, by cooling the spray. The simplest way to do this is to cool the spray solution. The only objections to this procedure are, first, that the spray solution may become sufficiently viscous at too low temperatures to interfere with its ready flowability; and, second, that the volume of air employed is so much greater than the volume of solution, even after atomization, that the effective cooling of the spray from cooling the solution is greatly reduced.

We found that a better way is to cool the atomizing air, and this can be done very effectively by passing the air through coils immersed in Dry Ice and acetone. By this means we obtained air temperatures well below −50 degrees Fahrenheit. Fog-free lights of filmed glass were produced by employing air at this temperature, but the reaction of the spray solution was so far retarded and the glass was cooled so rapidly that great care was required to maintain resistivity of the films at the desired values. We found air temperatures of around 32 degrees to be more practicable and clear fog-free films were obtained. Combinations of cooled air and cooled solutions may also be used effectively.

It is to be understood that the forms of the invention herewith shown and described are to be taken as illustrative embodiments only of the same, and that various changes in the shape, size and arrangement of parts, as well as various procedural changes may be resorted to without departing from the spirit of the invention or the scope of the subjoined claims.

We claim:

1. In a method of producing a transparent electrically conducting film by spraying a vitreous surface that has been heated to substantially its point of softening with a solution of a tin chloride during relative movement between said spray and said surface, the step of directing a blast of air from a position in advance of the spray at an acute angle relative to the plane of said surface against the leading edge of said spray along its line of contact with said surface.

2. In a method of producing a transparent electrically conducting film by spraying a vitreous surface that has been heated to substantially its point of softening with a solution of a tin chloride, the steps of reciprocating the spray back and forth over said surface until a film of the desired thickness has been formed, and directing a blast of air at an acute angle relative to the plane of said surface toward said surface and toward the leading edge of the spray along the line where said surface and leading edge meet from a position in advance of the spray during the first pass of said spray over said surface.

THOMAS K. YOUNG.
JAMES W. McAULEY.

References Cited in the file of this patent

UNITED STATES PATENTS

| Number | Name | Date |
| --- | --- | --- |
| 2,118,795 | Littleton | May 24, 1938 |
| 2,265,209 | Thomson | Dec. 9, 1941 |
| 2,328,448 | Gustafsson | Aug. 31, 1943 |
| 2,429,420 | McMaster | Oct. 21, 1947 |
| 2,570,245 | Junge | Oct. 9, 1951 |